No. 761,593. PATENTED MAY 31, 1904.
S. B. MACK.
PACKING RING.
APPLICATION FILED AUG. 23, 1902.
NO MODEL.
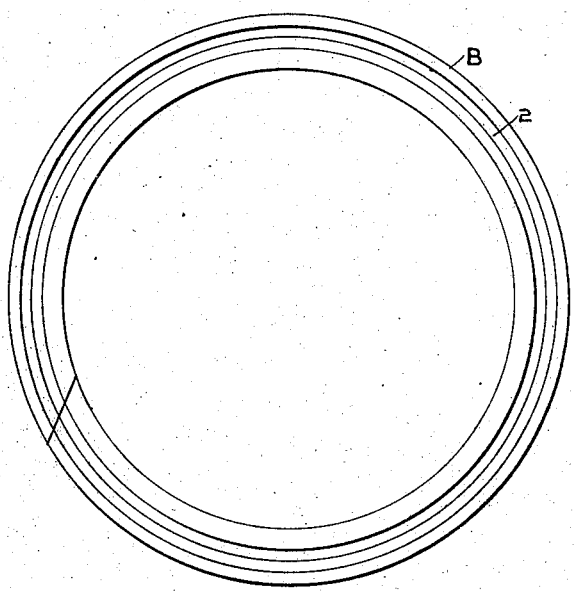
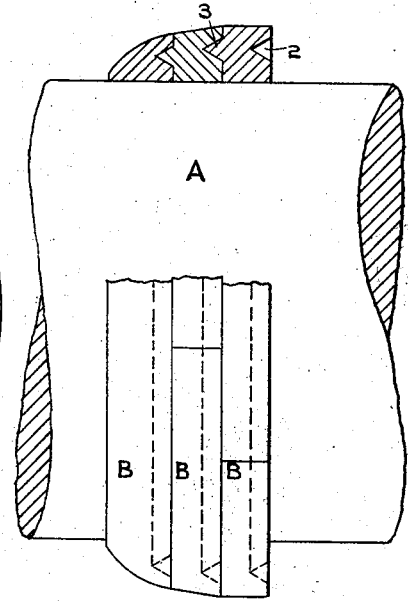
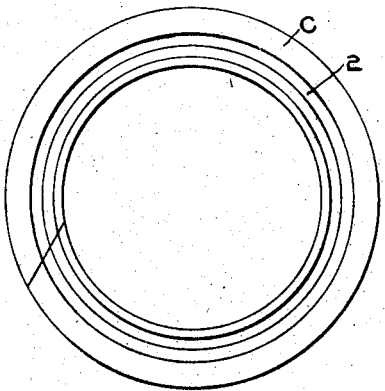
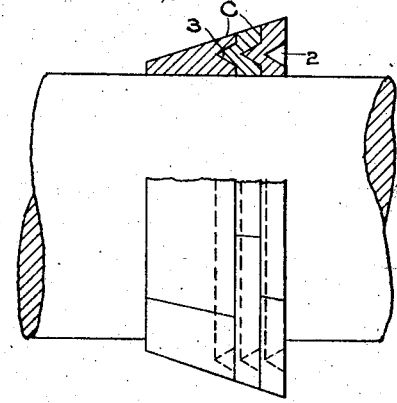
Witnesses,
W. H. Palmer
Emily Eastman Otis
Inventor,
Samuel B. Mack.
by Lothrop & Johnson
his Attorneys.

No. 761,593.

Patented May 31, 1904.

UNITED STATES PATENT OFFICE.

SAMUEL B. MACK, OF ST. PAUL, MINNESOTA.

PACKING-RING.

SPECIFICATION forming part of Letters Patent No. 761,593, dated May 31, 1904.

Application filed August 23, 1902. Serial No. 120,843. (No model.)

*To all whom it may concern:*

Be it known that I, SAMUEL B. MACK, a citizen of the United States, residing at St. Paul, in the county of Ramsey and State of Minnesota, have invented certain new and useful Improvements in Packing-Rings, of which the following is a specification.

My invention relates to improvements in packing-rings for piston-rods, valve-stems, &c., its object being particularly to construct the ring so that when a series of rings are placed together a tight joint may be secured between the adjacent rings.

To this end my invention consists of the construction hereinafter particularly described and claimed.

In the accompanying drawing, forming part of this specification, Figure 1 shows a series of my packing-rings surrounding a piston-rod, the rings being partly broken away. Fig. 2 is an end elevation of Fig. 1, showing the rings unbroken. Fig. 3 shows a modified form of ring applied to a valve-stem, the rings being partly broken away; and Fig. 4 is an end view of Fig. 3 with the rings unbroken.

In the drawings, A represents a piston-rod, and B packing-rings surrounding the same. Each of the packing-rings is formed with a V-shaped groove 2 in its lower side and a correspondingly-shaped rib 3 upon its upper side. The ribs and grooves 2 and 3 are intermediate of the inner and outer sides of the ring and preferably nearer to the outer than the inner side, as shown in Fig. 1.

In Figs. 3 and 4 I show a modified form of packing-ring designed for use with a valve-stem. The rings C are formed with grooves and ribs corresponding to the grooves and ribs 2 and 3 of the packing-rings B.

By having the ribs and grooves V-shaped and intermediate of the outer and inner faces of the rings a contact will be formed by the sharp point of the rib, even though there may be some irregularity in the surfaces of the rings, and the ribs will be protected from injury.

Having now described my invention, what I claim as new, and desire to secure by Letters Patent, is—

The combination of a series of packing-rings, each inside ring being formed upon one of its contacting faces with a V-shaped groove arranged some distance inside the outer and inner walls of the rings, the opposite contacting faces of the rings being formed with a V-shaped rib of a size and shape to completely fill the corresponding groove when the rings are brought together, the contacting faces of the rings upon the sides of said rib or groove being flat to allow said rings to be closely fitted together.

In testimony whereof I affix my signature in presence of two witnesses.

SAMUEL B. MACK.

Witnesses:
H. S. JOHNSON,
EMILY EASTMAN OTIS.